United States Patent
Hung (10) Patent No.: US 10,436,244 B2
(45) Date of Patent: Oct. 8, 2019

(54) SWIVEL JOINT FOR A SWIVEL SUPPORT DEVICE

(71) Applicant: MODERNSOLID INDUSTRIAL CO., LTD., Taichung (TW)

(72) Inventor: Chin-Jui Hung, Taichung (TW)

(73) Assignee: MODERNSOLID INDUSTRIAL CO., LTD., Taichung (TW)

( * ) Notice: Subject to any disclaimer, the term of this patent is extended or adjusted under 35 U.S.C. 154(b) by 356 days.

(21) Appl. No.: 15/437,650

(22) Filed: Feb. 21, 2017

(65) Prior Publication Data

US 2017/0261030 A1 Sep. 14, 2017

(30) Foreign Application Priority Data

Mar. 9, 2016 (TW) .............................. 105203183 U (51) Int. Cl.
| | |
|---|---|
| *F16C 11/00* | (2006.01) |
| *F16C 11/04* | (2006.01) |
| *F16M 13/02* | (2006.01) |
| *F16M 11/08* | (2006.01) |
| *F16M 11/16* | (2006.01) |
| *F16M 11/20* | (2006.01) |
| *F16M 11/24* | (2006.01) |

(52) U.S. Cl.
CPC .............. *F16C 11/04* (2013.01); *F16M 11/08* (2013.01); *F16M 11/16* (2013.01); *F16M 11/2014* (2013.01); *F16M 11/2092* (2013.01); *F16M 11/24* (2013.01); *F16M 13/02* (2013.01); *F16M 2200/022* (2013.01); *F16M 2200/044* (2013.01); *F16M 2200/06* (2013.01); *F16M 2200/063* (2013.01)

(58) Field of Classification Search
CPC ........... F16M 2200/06; F16M 11/2014; F16M 11/24; F16M 13/02; F16M 2200/022; F16M 2200/044; F16M 2200/063; F16M 11/08; F16M 11/16; F16M 11/2092; F16C 11/103; F16C 11/04
See application file for complete search history.

(56) References Cited

U.S. PATENT DOCUMENTS

| | | | |
|---|---|---|---|
| 7,186,007 B1* | 3/2007 | Rotwitt ................... | F21V 21/06 248/163.1 |
| 7,207,537 B2* | 4/2007 | Hung ..................... | F16M 11/10 248/274.1 |
| 7,338,022 B2* | 3/2008 | Hung ................... | F16M 11/041 248/278.1 |

(Continued)

*Primary Examiner* — Matthew R McMahon
(74) *Attorney, Agent, or Firm* — Burris Law, PLLC (57) ABSTRACT

A swivel joint includes a support tube, an inner post, a limit member and an adjustor. The support tube includes a tube body having a top open end, a receiving groove, and a through hole communicating with the receiving groove. The inner post is disposed in the tube body, and has a limiting groove. The limit member is disposed in the receiving groove, and has a stop portion disposed in the limiting groove, and an anchor portion disposed in the receiving groove. The adjustor extends into the receiving groove through the through hole and abuts against the limit member near the anchor portion to limit the anchor portion from moving toward the top open end such that the limit member prevents a releasing movement of the inner post through the top open end.

20 Claims, 10 Drawing Sheets

(56) References Cited

U.S. PATENT DOCUMENTS

| | | | | |
|---|---|---|---|---|
| 7,472,458 B2* | 1/2009 | Oddsen, Jr. | ............ | F16M 11/10 |
| | | | | 16/255 |
| 7,546,991 B2* | 6/2009 | Wang | .................... | F16M 11/08 |
| | | | | 248/125.1 |
| 7,861,998 B2* | 1/2011 | Huang | ................ | F16M 11/105 |
| | | | | 248/125.1 |
| 8,197,154 B2* | 6/2012 | Broering | ................ | F21V 21/28 |
| | | | | 248/274.1 |
| RE43,921 E * | 1/2013 | Smed | .................... | F16M 11/10 |
| | | | | 248/124.1 |
| 8,366,060 B2* | 2/2013 | Hung | ................... | F16M 11/041 |
| | | | | 248/124.1 |
| 8,794,579 B2* | 8/2014 | Sturman | ............. | F16M 11/105 |
| | | | | 248/284.1 |
| 9,027,894 B2* | 5/2015 | Sapper | .................. | F16M 11/08 |
| | | | | 248/274.1 |
| 9,599,276 B2* | 3/2017 | Grziwok | ............... | F16M 11/06 |
| 9,706,843 B2* | 7/2017 | Hung | ................... | F16M 11/105 |
| 10,066,785 B1* | 9/2018 | Chen | .................... | F16M 13/022 |
| 2008/0185487 A1* | 8/2008 | Beger | ................ | F16M 11/10 |
| | | | | 248/220.21 |
| 2012/0025037 A1* | 2/2012 | Chang | ................ | F16M 11/2014 |
| | | | | 248/124.1 |
| 2016/0091117 A1* | 3/2016 | Boccoleri | .............. | F16M 11/10 |
| | | | | 348/804 |

* cited by examiner

FIG.10

SWIVEL JOINT FOR A SWIVEL SUPPORT DEVICE

CROSS-REFERENCE TO RELATED APPLICATION

This application claims priority to Taiwanese Patent Application No. 105203183, filed on Mar. 9, 2016.

FIELD

The disclosure relates to a swivel support device, and more particularly to a swivel joint for a swivel support device.

BACKGROUND

Figure 1:
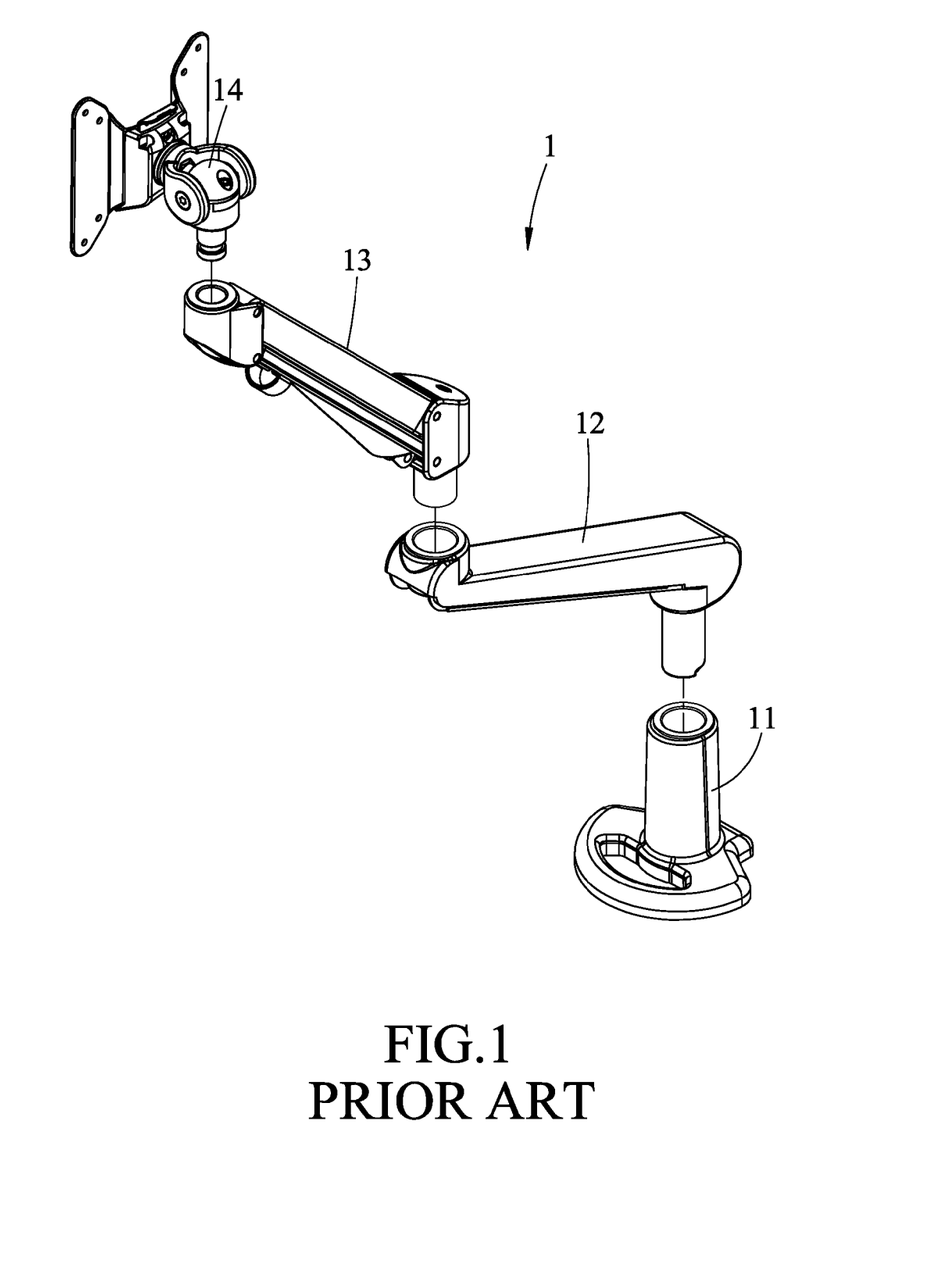
FIG. 1 is a perspective view of an existing support device.
Figure 2:
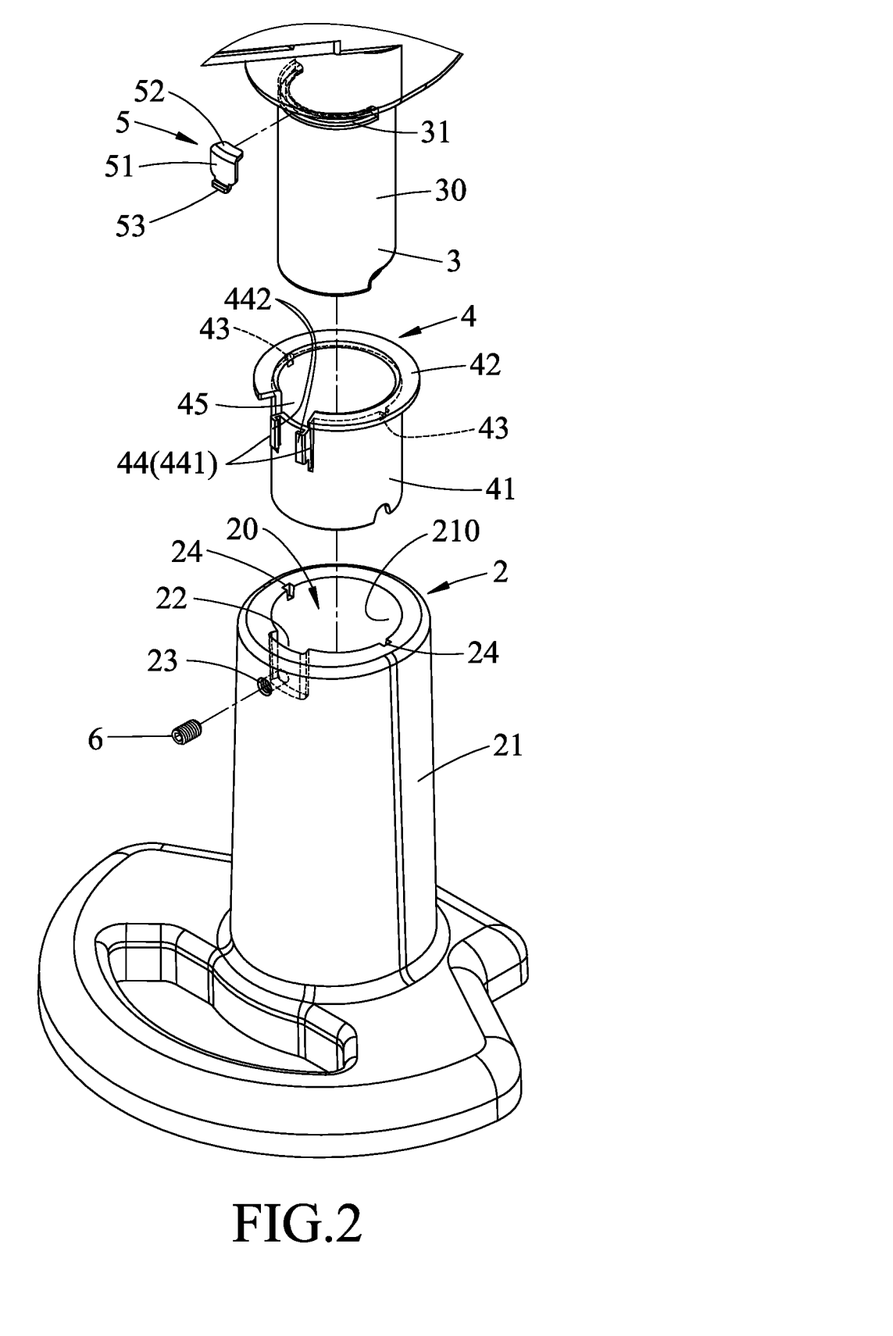
FIG. 2 is a fragmentary exploded perspective view of a swivel joint according to a first embodiment of the disclosure.
Figure 3:
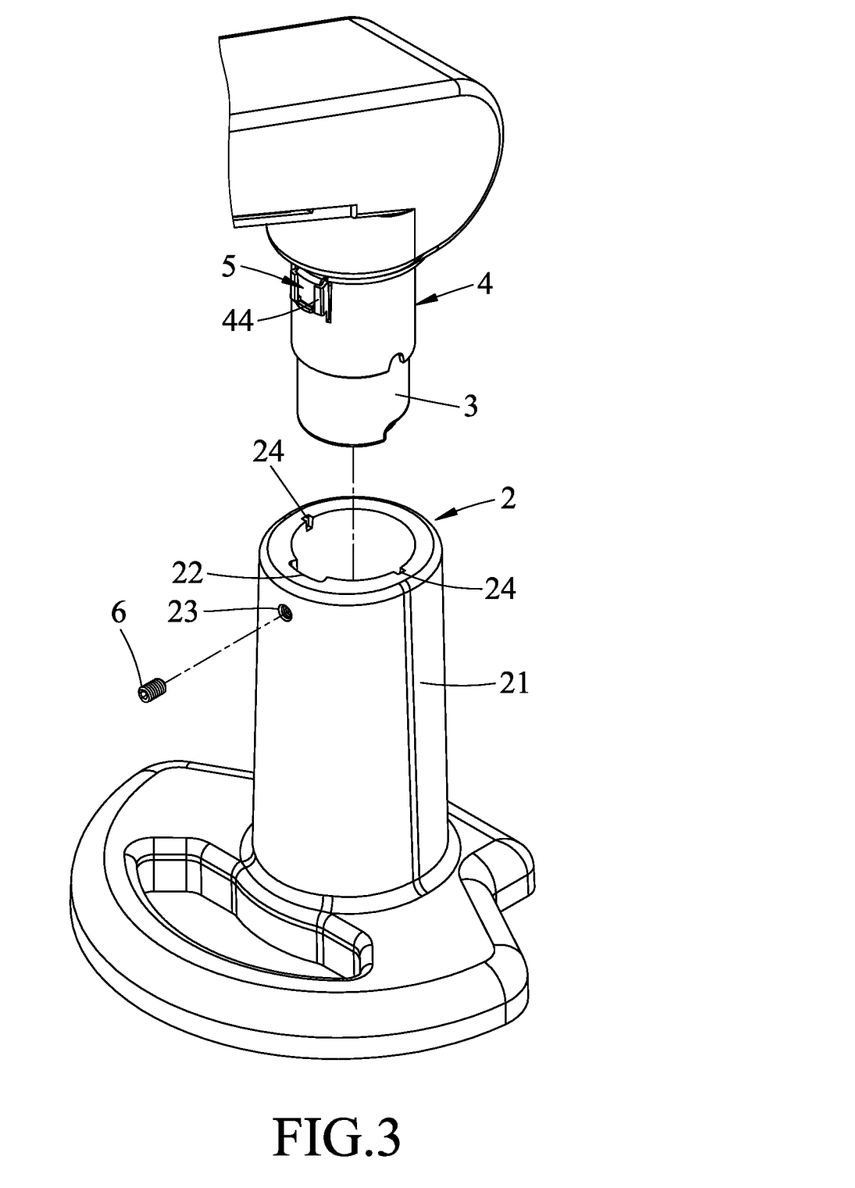
FIG. 3 is a fragmentary exploded view of the first embodiment, but illustrating the swivel joint in a partially assembled state.

Referring to FIG. 1, an existing swivel support device 1 includes a base seat 11, a first swivel arm 12 pivotally connected to the base seat 11, a second swivel arm 13 pivotally connected to the first swivel arm 12, and a mounting frame 14 pivotally connected to the second swivel arm 13. In assembly, the first swivel arm 12 has a projection portion projecting downward into the base seat 11, and is angularly adjustable to rotate with respect to the base seat 11. The second swivel arm 13 has a projection portion projecting downward into the first swivel arm 12 and is angularly adjustable to rotate with respect to the first swivel arm 12. The mounting frame 14 extends downward into the second swivel arm 13 and is angularly adjustable with respect to the second swivel arm 13. Accordingly, the mounting frame 14 can be conveniently adjusted to an appropriate position. However, during adjustment of the existing swivel support device 1, the mounting frame 14 is easily separated from the second swivel arm 13 by an accidentally applied upward external force. Likewise, because of the upward external force, the first and second swivel arms 12, 13 may be accidently separated from each other and the first swivel arm 12 may be accidently separated from the base seat 11.

Because the first and second swivel arms 12, 13 are rotatable 360 degrees, the range of adjustment is considerably wide. However, in practice, an installation space for the existing swivel support device 1 may be insufficient for such a wide adjustment range. In use, the existing swivel support device 1 can easily and accidentally over-rotate and impact a thing nearby. It is not easy to control the existing swivel support device 1.

On the other hand, when the mounting frame 14 is loaded with an object, an additional weight may influence the forces of rotating the first and second swivel arms 12, 13, and the mounting frame 14, and the joints formed thereamong require different rotation tightness. However, the existing swivel support device 1 is not adjustable to obtain desirable snugness for rotation of the joints.

SUMMARY

Therefore, an object of the disclosure is to provide a swivel joint that can alleviate the drawbacks of the prior art.

According to the disclosure, a swivel joint for a swivel support device includes a support tube, an inner post, a limit member and an adjustor.

The support tube includes a tube body having a top open end, an inner surface, a receiving groove indented from the inner surface, and a through hole extending inwardly from an outer surface of the tube body and communicating with the receiving groove.

The inner post is disposed rotatably in the tube body, and has an outer periphery and a limiting groove formed angularly in the outer periphery.

The limit member is disposed in the receiving groove, and has a stop portion extending into the limiting groove, and an anchor portion disposed in the receiving groove.

The adjustor extends into the receiving groove through the through hole and abuts against the limit member near the anchor portion to limit the anchor portion from moving toward the top open end such that the limit member prevents a releasing movement of the inner post through the top open end.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Before the disclosure is described in greater detail, it should be noted that where considered appropriate, reference numerals or terminal portions of reference numerals have been repeated among the figures to indicate corresponding or analogous elements, which may optionally have similar characteristics.

Referring to FIGS. 2 to 5, a swivel joint according to a first embodiment of the disclosure includes a support tube 2, an inner post 3, a sleeve 4, a limit member 5 and an adjustor 6.

The support tube 2 includes a tube body 21 having a top open end 20, an inner surface 210, a receiving groove 22 indented from the inner surface 210, and a through hole 23 extending inwardly from an outer surface of the tube body 21 and communicating with the receiving groove 22. In this embodiment, the tube body 21 further includes two spaced-apart positioning recesses 24 indented from the inner surface 210 of the tube body 21 at the top open end 20.

The inner post 3 is cylindrical, and has an outer periphery 30 and a limiting groove 31 formed angularly in the outer periphery 30. In this embodiment, the limiting groove 31 extends angularly around a rotation axis of the inner post 3 about 180 degrees.

The sleeve 4 is disposed between the tube body 21 and the inner post 3, and has a sleeve wall 41, a flange portion 42 extending radially and outward from a top end of the sleeve wall 41, two spaced-apart protrusions 43 projecting radially and outwardly from the sleeve wall 41 proximally of the flange portion 42, an insertion groove member 44 disposed outward on the sleeve wall 41, and an opening 45 formed in the sleeve wall 41 immediately above the insertion groove member 44. In this embodiment, in order to position the sleeve 4 relative to the support tube 2, the number of the protrusions 43 and the positioning recesses 24 is two. The insertion groove member 44 has two spaced-apart axially extending wing portions 441 that project radially outward from the sleeve wall 41 and that respectively have axially extending flanged ends 442 protruding toward each other. The spaced apart top ends of the wing portions 441 are adjacent to the opening 45, and the limit member 5 is inserted into the insertion groove member 44 through the spaced apart top ends. In addition, the sleeve 4 is made from a plastic material and is resilient to permit slight deformation.

The limit member 5 has an abutment portion 51 and stop and anchor portions 52, 53 respectively angled from two opposite ends of the abutment portion 51 to project in opposite directions. The stop portion 52 projects from a top end of the abutment portion 51 to the inner post 3. The anchor portion 53 projects from a bottom end of the abutment portion 51 toward the support tube 2. In this embodiment, the anchor portion 53 has a width smaller than that of the spacing between the flanged ends 442 of the wing portion 441 and is able to pass through the flanged ends 442 to reach the bottom of the insertion groove member 44. As such, the abutment portion 51 can be inserted between the wing portions 441, and the stop portion 52 of the limit member 5 can pass through the opening 45 of the sleeve 4 to extend into the limiting groove 31 of the inner post 3.

The adjustor 6 is externally threaded to be screwed into the through hole 23. In this embodiment, the anchor portion 53 is engageable with the adjustor 6 to limit the movement of the limit member 5 toward the top open end 20 of the support tube 2.

In assembly, the inner post 3 is inserted into the sleeve 4, and the limit member 5 is inserted into the insertion groove member 44 of the sleeve 4. Thereafter, the sleeve 4 and the inner post 3 are together inserted into the tube body 21, such that the insertion groove member 44 and the limit member 5 extend into the receiving groove 22. When the flange portion 42 abuts against the top open end 20 of the support tube 2 and the protrusions 43 are respectively disposed into the positioning recesses 24, the sleeve 4 is positioned to the support tube 2 and is disposed between the tube body 21 and the inner post 3. The inner post 3 is disposed rotatably in the sleeve 4. The opening 45 allows passage of the stop portion 52 of the limit member 5 from the receiving groove 22 to the limiting groove 31. The anchor portion 53 of the limit member 5 is disposed in the receiving groove 22, and is more distal from the top open end 20 of the support tube 2 than the stop portion 52.

Afterwards, the adjustor 6 extends into the receiving groove 22 by being screwed into the through hole 23, and abuts against the abutment portion 51 of the limit member 5 near the anchor portion 53 to limit the anchor portion 53 from moving toward and out of the top open end 20 of the support tube 2 such that the limit member 5 prevents a releasing movement of the inner post 3 and the sleeve 4 through the top open end of the support tube 2.

Figure 4:
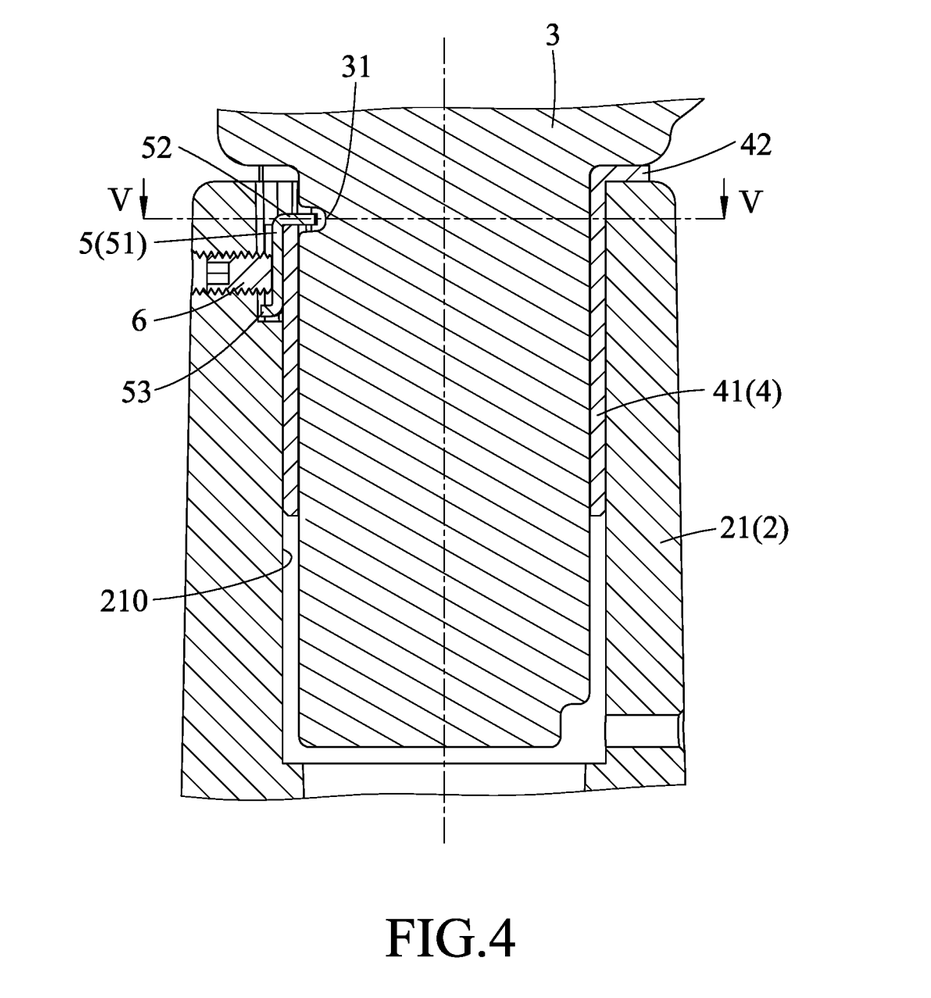
FIG. 4 is a fragmentary sectional view of the first embodiment.
Figure 5:
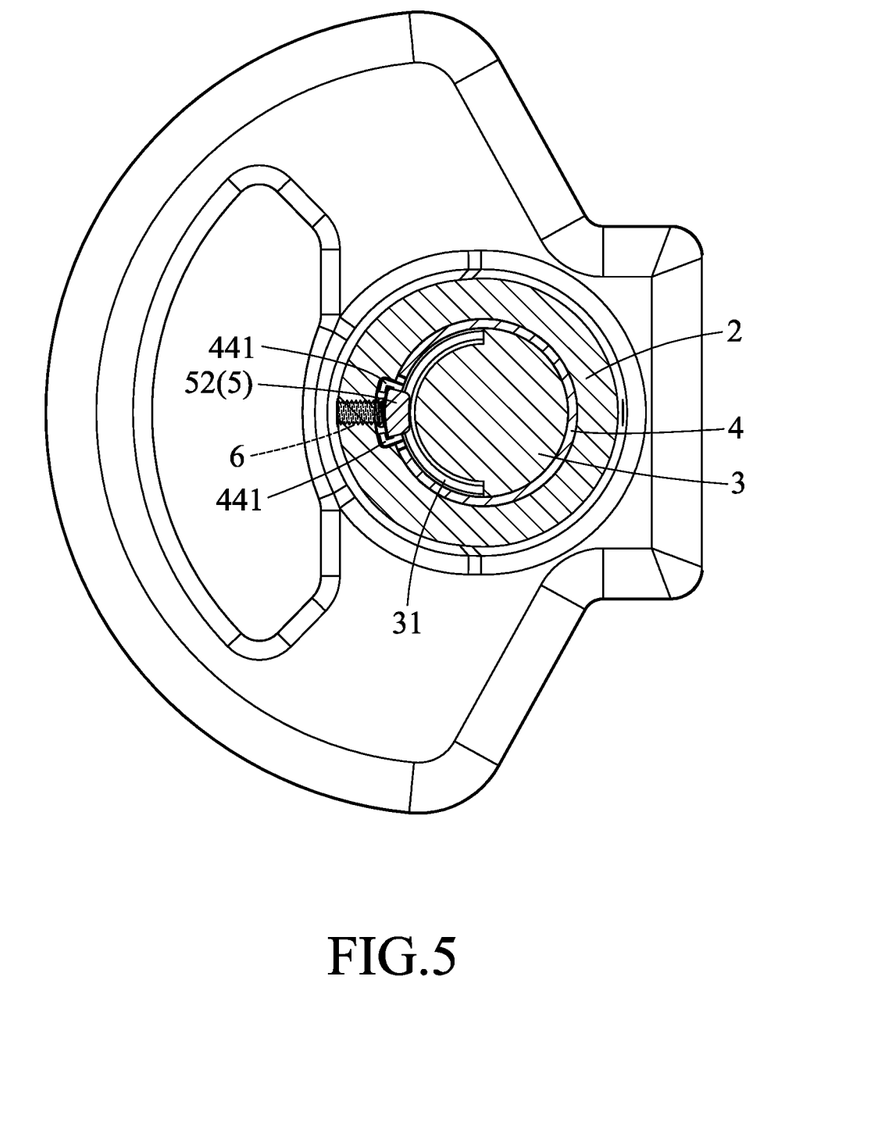
FIG. 5 is a top sectional view taken along line V-V of FIG. 4.

When the adjustor 6 is adjusted to extend further into the through hole 23, the adjustor 6 pushes the limit member 5 to press the sleeve 4 abuttingly against the inner post 3. Because the sleeve 4 is slightly deformable and compressible, the sleeve 4 can be compressed to abut tightly against the inner post 3. Accordingly, contact friction between the sleeve 4 and the inner post 3 can be adjustable through the adjustor 6 to control rotation tightness of the inner post 3 relative to the sleeve 4. Of course, when the adjustor 6 pushes further the limit member 5 to increase the contact friction between the sleeve 4 and the inner post 3, the inner post 3 may be positioned relative to the sleeve 4 and the support tube 2. It should be noted that, under the condition that the adjustor 6 is not tightened against the limit member 5, there is a clearance between the stop portion 52 and the limiting groove 31, and the inner post 3 is allowed to rotate within a movable limited angle range of the limiting groove 31 relative to the support tube 2.

Figure 6:
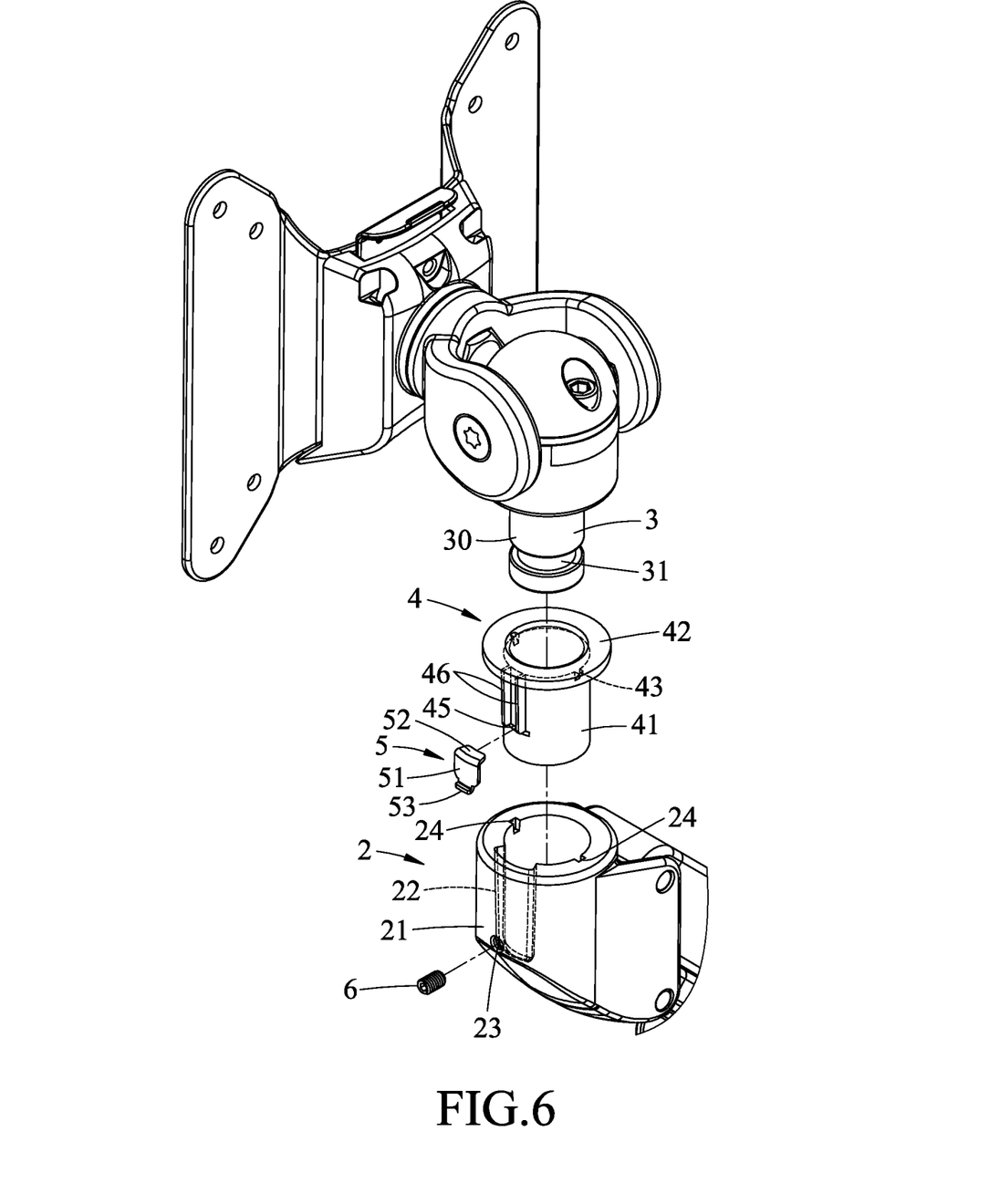
FIG. 6 is a fragmentary exploded view of a swivel joint according to a second embodiment of the disclosure.
Figure 7:
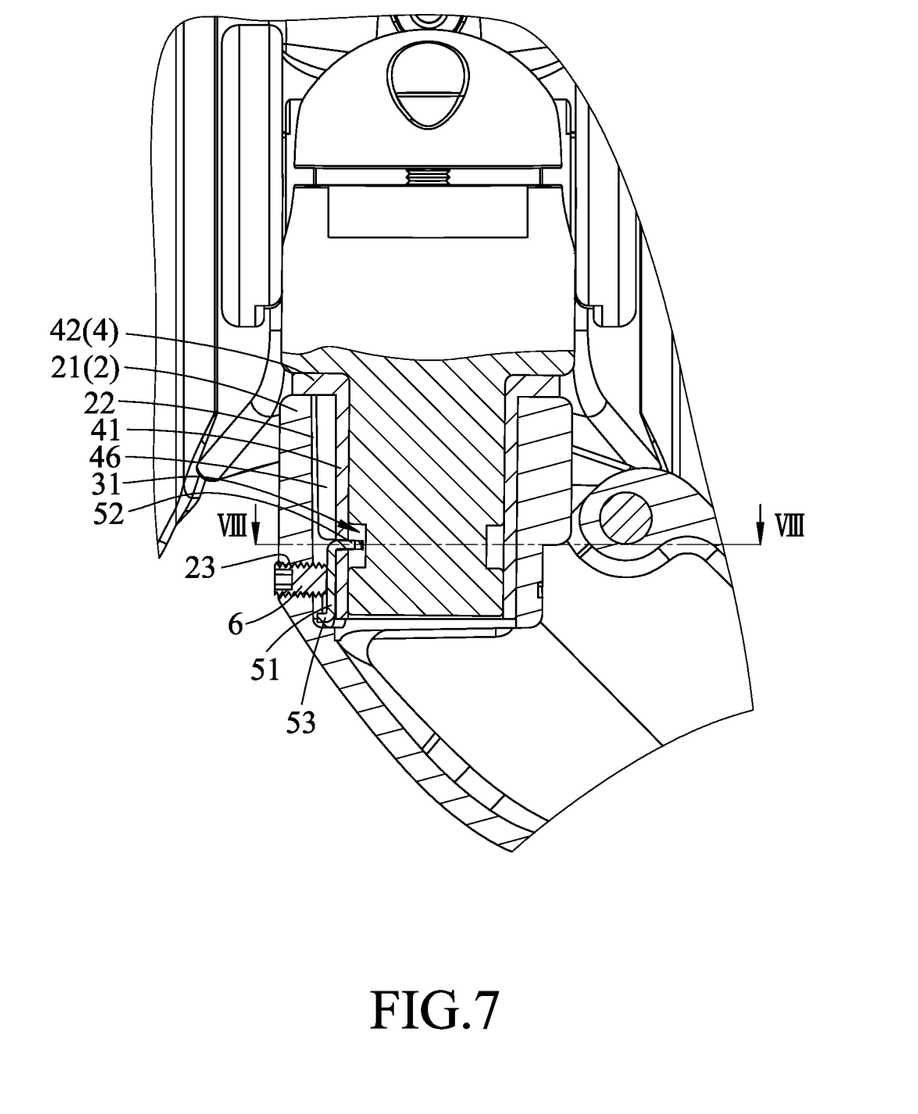
FIG. 7 is a partly sectional view of the second embodiment.
Figure 8:
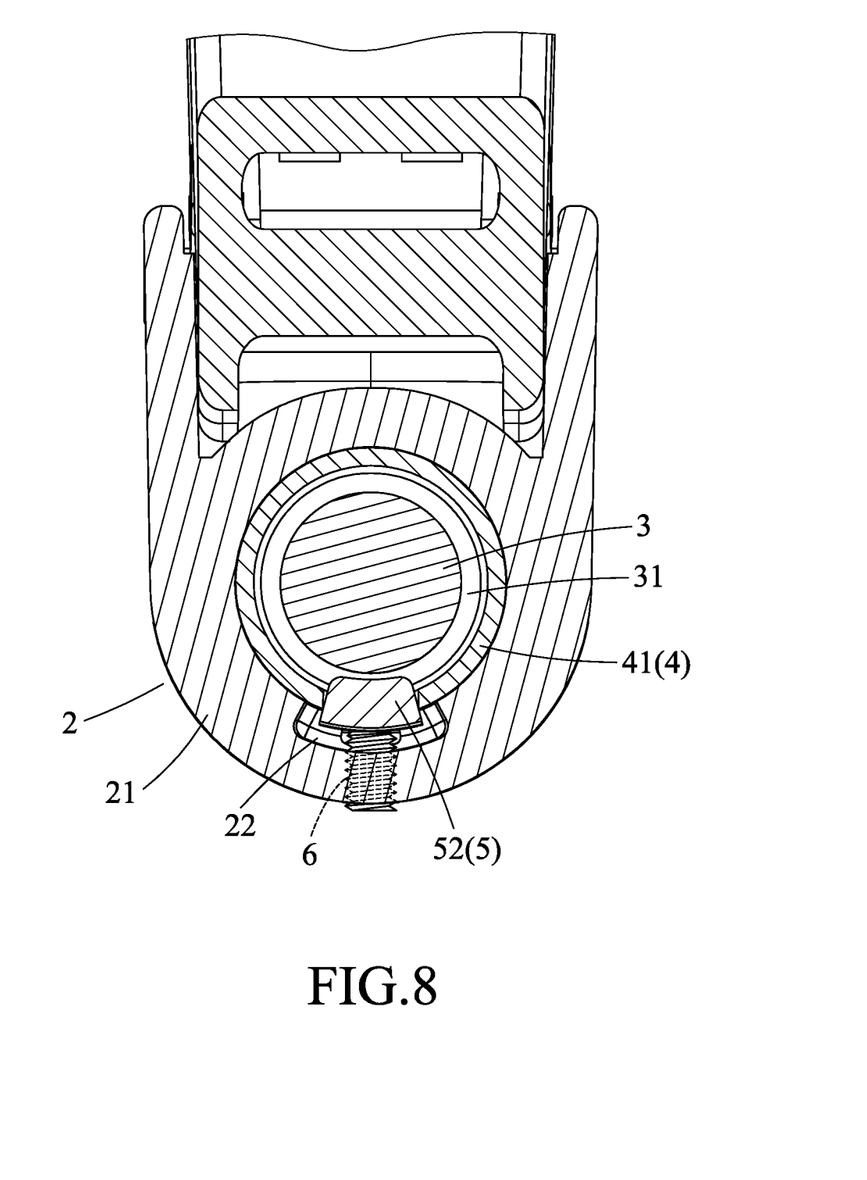
FIG. 8 is a top sectional view taken along line VIII-VIII of FIG. 7.

FIGS. 6 to 8 illustrate a swivel joint according to a second embodiment of the disclosure, which has a structure generally similar to that of the first embodiment. However, the main differences of the second embodiment reside in the structures of the sleeve 4 and the inner post 3. In the second embodiment, the insertion groove member 44 is dispensed with. The opening 45 extends radially through the sleeve wall 41 and is located away from the top end of the sleeve wall 41. The sleeve 4 additionally has two spaced-apart ribs 46 that extend axially between the top open end of the sleeve wall 41 and the opening 45 to avoid erroneous installation of the limit member 5. The flange portion 42 completely circles the top end of the sleeve wall 41. The limiting groove 31 of the inner post 3 in the second embodiment is formed in the outer surface 30 of the inner post 3 and extends around the rotation axis of the inner post 3 about 360 degrees. The limit member 5 is located below the ribs 46, and the stop portion 52 of the limit member 5 extends into the limiting groove 31 through the opening 45. The inner post 3 is rotatable 360 degrees relative to the support tube 2. After the inner post 3 is rotated to a desired angle, it may be fixed by adjusting the adjustor 6 and the limit member 5.

Figure 9:
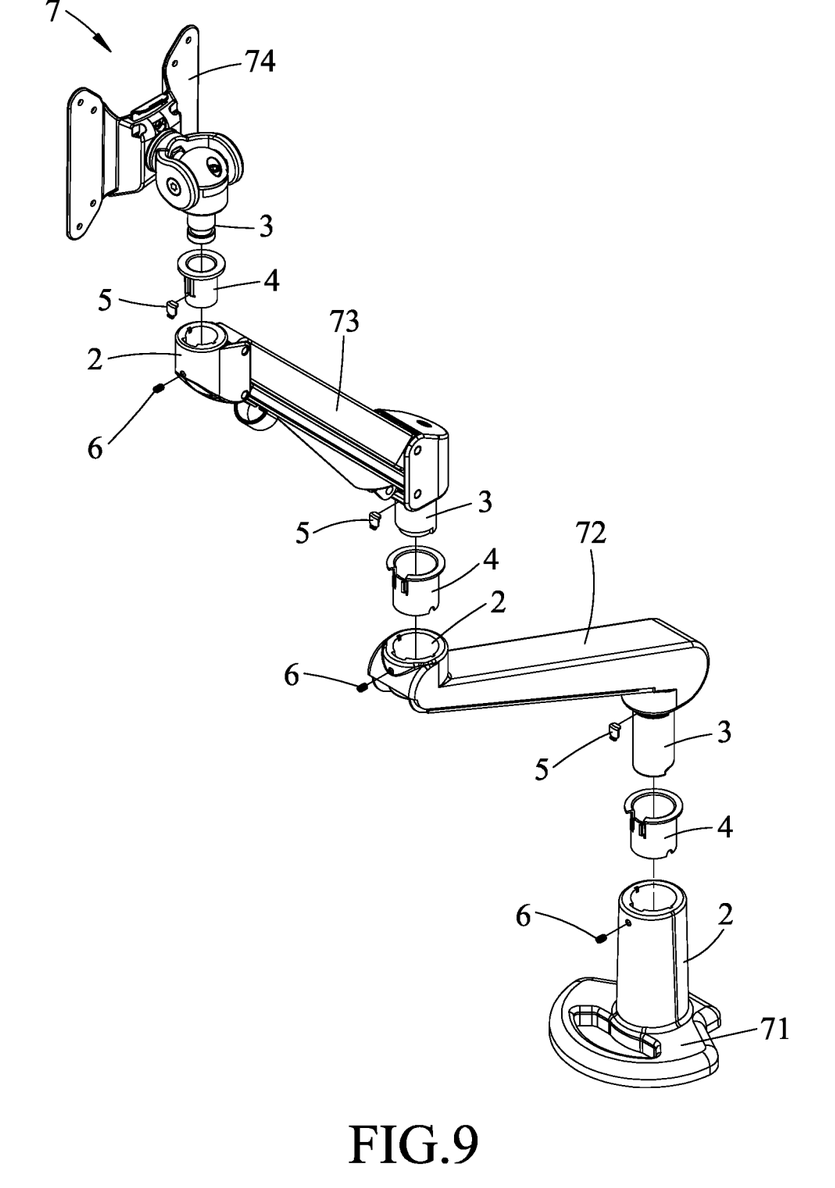
FIG. 9 is an exploded view, illustrating a swivel support device incorporating the first and second embodiments.
Figure 10:
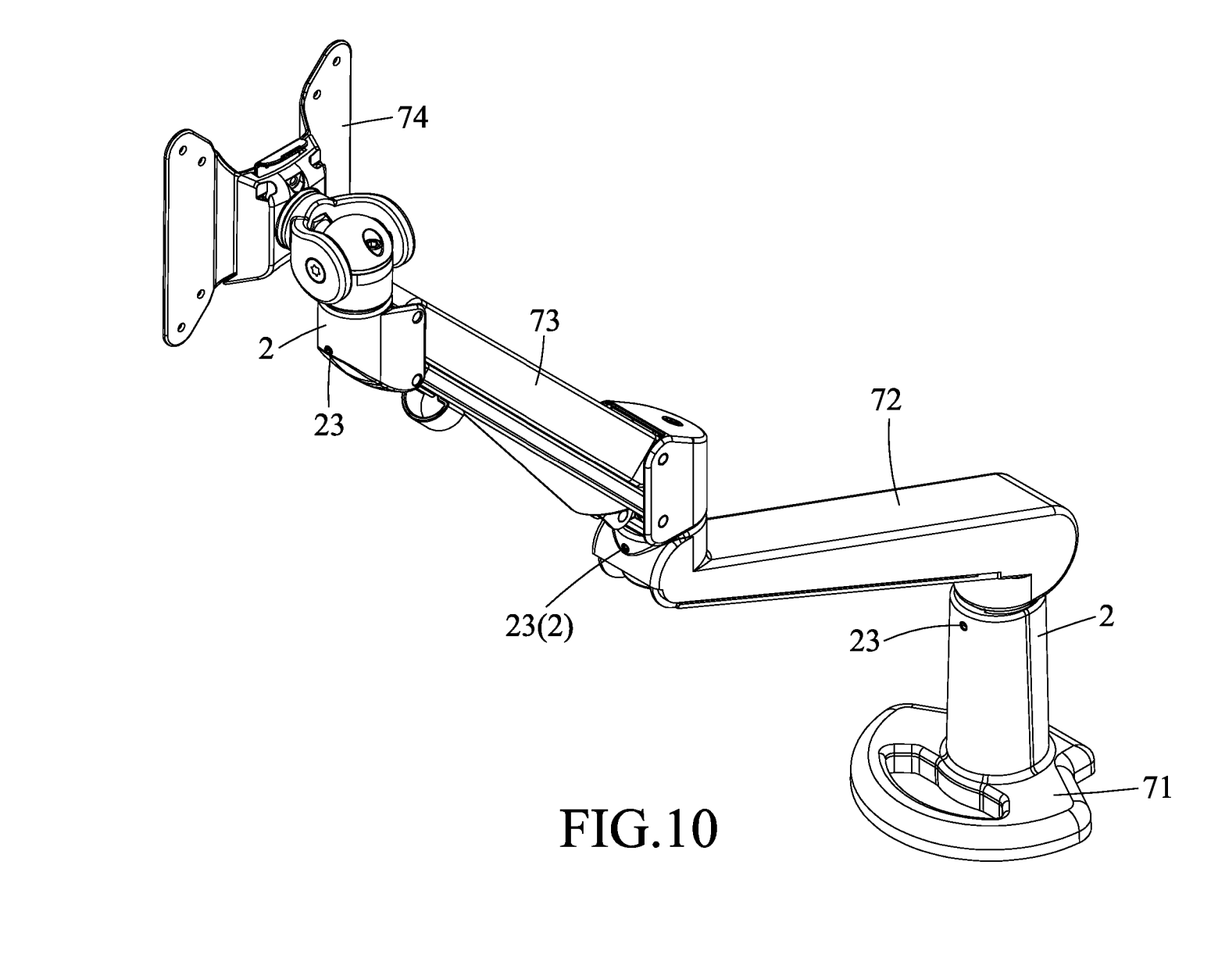
FIG. 10 is a perspective view of the swivel support device of FIG. 9.

FIGS. 9 and 10 illustrate a swivel support device 7 incorporating the swivel joint of the first and second embodiments. The swivel support device 7 includes a support seat 71, a first swivel arm 72, a second swivel arm 73 and a mounting frame 74. The support tube 2 projects upward from the support seat 71, and the inner post 3 of the first embodiment projects downward from an end of the first swivel arm 72, such that the first swivel arm 72 is rotatably connected to the support seat 71 and is rotary about the support tube 2 through use of the swivel joint of the first embodiment. By adjustment of the adjustor 6 abutting against the limit member 5, rotation of the first swivel arm 72 relative to the support seat 71 can be adjusted in tightness and the first swivel arm 72 is not easily released from the support seat 71. Similarly, the second swivel arm 73 has an end that is rotatably connected to another end of the first swivel arm 72 by use of the swivel joint of the first embodiment. The support tube 2 of the second embodiment projects upward from another end of the second swivel arm 73. The inner post 3 of the second embodiment projects downward from the mounting frame 74. Through use of the swivel joint of the second embodiment, the mounting frame 74 is rotatably connected to the second swivel arm 73 and is rotatable 360 degrees relative to the second swivel arm 73.

From the aforesaid description, the advantages and efficiencies of the swivel joint according to the present disclosure are as follows:

1. By virtue of the adjustor 6 abutting against the limit member 5, the releasing movement of the inner post 3 is prevented from the support tube 2.

2. By adjustment of the adjustor 6 abutting against the limit member 5, the rotation tightness of the inner post 3 relative to the sleeve 4 is adjustable, and may be increased to hold tightly the inner post 3 in the sleeve 4. By use of the swivel joint of the present disclosure, the first and second swivel arms 72, 73, and the mounting frame 74 may be adjustable in snugness of fit for rotation.

3. By cooperation of the stop portion 52 disposed in the limiting groove 31 and the angular configuration of the limiting groove 31, the inner post 3 may be adjusted in angular rotation relative to the support tube 2. With use the swivel joint of the present disclosure, the swivel support device 7 is suitable for being installed in a limited space.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what is considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A swivel joint for a swivel support device, comprising:
   a support tube including a tube body having a top open end, an inner surface, a receiving groove indented from said inner surface, and a through hole extending inwardly from an outer surface of said tube body and communicating with said receiving groove;
   an inner post disposed rotatably in said tube body, and having an outer periphery and a limiting groove formed angularly in said outer periphery;
   a sleeve disposed between said tube body and said inner post;
   a limit member disposed in said receiving groove, and having a stop portion extending into said limiting groove, and an anchor portion disposed in said receiving groove; and
   an adjustor extending into said receiving groove through said through hole and abutting against said limit member near said anchor portion to limit said anchor portion from moving toward and out of said top open end such that said limit member prevents a releasing movement of said inner post through said top open end,
   wherein said limit member further has an abutment portion abutted by said adjustor, said stop and anchor portions respectively being angled from two opposite ends of said abutment portion, and
   wherein said adjustor pushes said abutment portion to press said sleeve abuttingly against said inner post.

2. The swivel joint as claimed in claim 1, wherein said sleeve further has an insertion groove member extending into said receiving groove to receive said limit member, an opening being formed immediately above said insertion groove member to allow passage of said stop portion when said limit member is received in said insertion groove member.

3. The swivel joint as claimed in claim 1, wherein:
   said support tube further includes at least one positioning recess indented from said inner surface of said tube body; and
   said sleeve further has a sleeve wall, a flange portion extending radially and outward from a top end of said sleeve wall and abutting against said top open end of said support tube, and at least one protrusion projecting from said sleeve wall into said at least one positioning recess.

4. The swivel joint as claimed in claim 3, wherein said at least one positioning recess has two spaced-apart positioning recesses, said at least one protrusion having two protrusions projecting from said sleeve wall proximally of said flange portion, said protrusions respectively disposed in said positioning recesses.

5. The swivel joint as claimed in claim 1, wherein said adjustor is externally threaded and screwed into said through hole.

6. The swivel joint as claimed in claim 1, wherein said inner post is cylindrical, said limiting groove extending angularly around a rotation axis of said inner post, said inner post being rotatable within a limited angle relative to said support tube.

7. The swivel joint as claimed in claim 1, wherein said anchor portion is more distal from said top open end than said stop portion.

8. A swivel joint for a swivel support device, comprising:
   a support tube including a tube body having a top open end, an inner surface, a receiving groove indented from said inner surface, and a through hole extending inwardly from an outer surface of said tube body and communicating with said receiving groove;
   an inner post disposed rotatably in said tube body, and having an outer periphery and a limiting groove formed angularly in said outer periphery;
   a sleeve disposed between said tube body and said inner post;
   a limit member disposed in said receiving groove, and having a stop portion extending into said limiting groove, and an anchor portion disposed in said receiving groove; and
   an adjustor extending into said receiving groove through said through hole and abutting against said limit member near said anchor portion to limit said anchor portion from moving toward and out of said top open end such that said limit member prevents a releasing movement of said inner post through said top open end,
   wherein said limit member further has an abutment portion abutted by said adjustor, said stop and anchor portions respectively being angled from two opposite ends of said abutment portion, said anchor portion being engageable with said adjustor to limit the movement of said limit member toward said top open end, said adjustor pushing said abutment portion to press said sleeve abuttingly against said inner post.

9. The swivel joint as claimed in claim 8, wherein said sleeve further has an insertion groove member extending into said receiving groove to receive said limit member, an opening being formed immediately above said insertion groove member to allow passage of said stop portion when said limit member is received in said insertion groove member.

10. The swivel joint as claimed in claim 8, wherein:
said support tube further includes at least one positioning recess indented from said inner surface of said tube body; and
said sleeve further has a sleeve wall, a flange portion extending radially and outward from a top end of said sleeve wall and abutting against said top open end of said support tube, and at least one protrusion projecting from said sleeve wall into said at least one positioning recess.

11. The swivel joint as claimed in claim 10, wherein said at least one positioning recess has two spaced-apart positioning recesses, said at least one protrusion having two protrusions projecting from said sleeve wall proximally of said flange portion, said protrusions respectively disposed in said positioning recesses.

12. The swivel joint as claimed in claim 8, wherein said adjustor is externally threaded and screwed into said through hole.

13. The swivel joint as claimed in claim 8, wherein said inner post is cylindrical, said limiting groove extending angularly around a rotation axis of said inner post, said inner post being rotatable within a limited angle relative to said support tube.

14. The swivel joint as claimed in claim 8, wherein said anchor portion is more distal from said top open end than said stop portion.

15. A swivel joint for a swivel support device, comprising:
a support tube including a tube body having a top open end, an inner surface, a receiving groove indented from said inner surface, and a through hole extending inwardly from an outer surface of said tube body and communicating with said receiving groove;
an inner post disposed rotatably in said tube body, and having an outer periphery and a limiting groove formed angularly in said outer periphery;
a limit member disposed in said receiving groove, and having a stop portion extending into said limiting groove, and an anchor portion disposed in said receiving groove; and
an adjustor extending into said receiving groove through said through hole and abutting against said limit member near said anchor portion to limit said anchor portion from moving toward and out of said top open end such that said limit member prevents a releasing movement of said inner post through said top open end,
wherein said limit member further has an abutment portion abutted by said adjustor, said stop and anchor portions respectively being angled from two opposite ends of said abutment portion, said anchor portion being engageable with said adjustor to limit the movement of said limit member toward said top open end.

16. The swivel joint as claimed in claim 15, wherein:
said support tube further includes at least one positioning recess indented from said inner surface of said tube body; and
said sleeve further has a sleeve wall, a flange portion extending radially and outward from a top end of said sleeve wall and abutting against said top open end of said support tube, and at least one protrusion projecting from said sleeve wall into said at least one positioning recess.

17. The swivel joint as claimed in claim 16, wherein said at least one positioning recess has two spaced-apart positioning recesses, said at least one protrusion having two protrusions projecting from said sleeve wall proximally of said flange portion, said protrusions respectively disposed in said positioning recesses.

18. The swivel joint as claimed in claim 15, wherein said adjustor is externally threaded and screwed into said through hole.

19. The swivel joint as claimed in claim 15, wherein said inner post is cylindrical, said limiting groove extending angularly around a rotation axis of said inner post, said inner post being rotatable within a limited angle relative to said support tube.

20. The swivel joint as claimed in claim 15, wherein said anchor portion is more distal from said top open end than said stop portion.

* * * * *